(12) United States Patent
Kanemaru

(10) Patent No.: US 10,401,835 B2
(45) Date of Patent: Sep. 3, 2019

(54) NUMERICAL CONTROLLER PERFORMING TABLE-FORMAT-DATA-BASED OPERATION

(71) Applicant: FANUC Corporation, Yamanashi (JP)

(72) Inventor: Akira Kanemaru, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 249 days.

(21) Appl. No.: 15/190,253

(22) Filed: Jun. 23, 2016

(65) Prior Publication Data

US 2017/0003670 A1    Jan. 5, 2017

(30) Foreign Application Priority Data

Jun. 30, 2015    (JP) .................................. 2015-131716

(51) Int. Cl.
  *G05B 19/416*    (2006.01)
(52) U.S. Cl.
  CPC .. *G05B 19/416* (2013.01); *G05B 2219/43006* (2013.01); *G05B 2219/43009* (2013.01);
  (Continued)
(58) Field of Classification Search
  CPC ..................... G05B 19/416; G05B 2219/43006
  See application file for complete search history.

(56) References Cited

U.S. PATENT DOCUMENTS 3,970,830 A * 7/1976 White .................. G05B 19/184
  318/567
4,692,856 A    9/1987 Komiya
  (Continued)

FOREIGN PATENT DOCUMENTS

JP    59-177604 A    10/1984
JP    S63-256335 A   10/1988
  (Continued)

OTHER PUBLICATIONS

Office Action in JP Application No. 2015-131716, dated Aug. 29, 2017, 9 pp.
  (Continued)

*Primary Examiner* — Chun Cao
*Assistant Examiner* — Gary Collins
(74) *Attorney, Agent, or Firm* — Hauptman Ham, LLP

(57) ABSTRACT

A numerical controller for performing table-format-data-based operation control includes a reading unit that analyzes a command block read from table format data to acquire a reference value and a coordinate value of a control point and outputs the reference value and the coordinate value, a segment distinction unit that divides movement to the control point into acceleration/deceleration segments and a constant speed segment, a feed speed calculation unit that calculates a feed speed in the constant speed segment, and a distribution process unit that calculates the travel of a controlled axis for each control cycle so that acceleration/deceleration is applied in the acceleration/deceleration segments and the feed speed calculated by the feed speed calculation unit is achieved, and delay in the coordinate value with respect to the reference value based on the acceleration/deceleration control is corrected by using the feed speed calculated by the feed speed calculation unit.

6 Claims, 9 Drawing Sheets

(52) U.S. Cl.
CPC .............. *G05B 2219/43034* (2013.01); *G05B 2219/43097* (2013.01)

(56) References Cited

U.S. PATENT DOCUMENTS

| | | | | |
|---|---|---|---|---|
| 5,508,596 | A | * 4/1996 | Olsen | ................ B26F 3/004 318/569 |
| 2003/0191553 | A1 | 10/2003 | Isohata | |
| 2008/0082203 | A1 | 4/2008 | Watanabe et al. | |
| 2013/0317653 | A1 | 11/2013 | Ueda et al. | |

FOREIGN PATENT DOCUMENTS

| | | |
|---|---|---|
| JP | H4-35810 A | 2/1992 |
| JP | 6-332512 A | 12/1994 |
| JP | 2003-303005 A | 10/2003 |
| JP | 2007-26119 A | 2/2007 |
| JP | 2007-304714 A | 11/2007 |
| JP | 2008-90513 A | 4/2008 |
| WO | 2013/175615 A1 | 11/2013 |

OTHER PUBLICATIONS

Notice of Allowance in JP Application No. 2015-131716, dated Mar. 20, 2018, 6pp.

\* cited by examiner

FIG.2
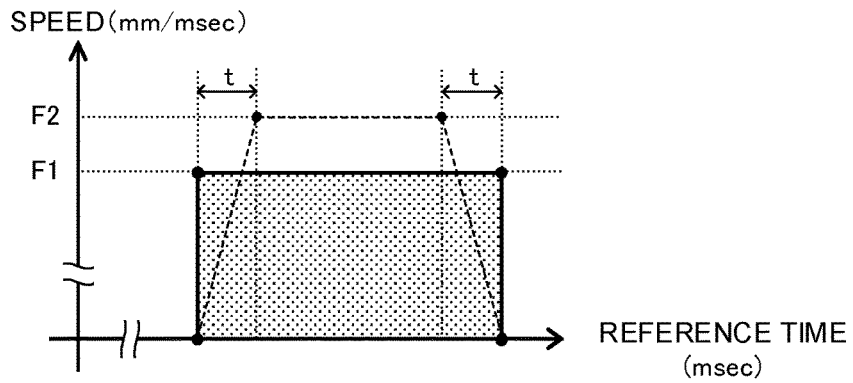
<RELATED ART>
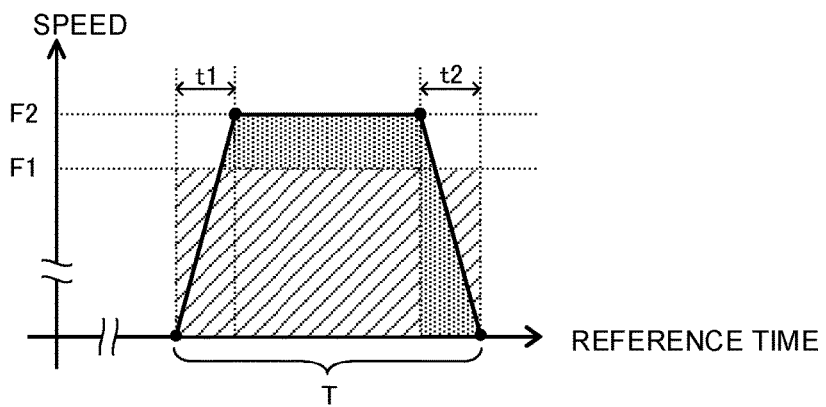
<RELATED ART : CONSTANT ACCELERATION>
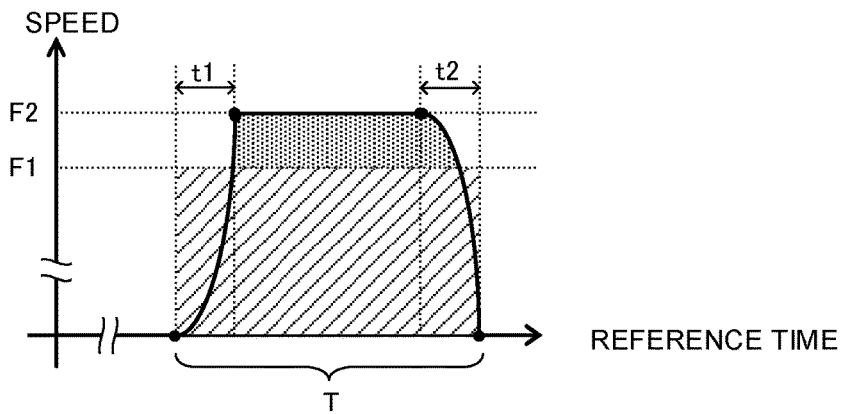
<PRESENT INVENTION : CONSTANT JERK>

FIG.4

<TYPICAL TABLE FORMAT DATA TO WHICH COMMAND BLOCKS FOR ACCELERATION/
DECELERATION ARE ADDED>

```
<TIME_TABLE_0301_X>
:
L1000 X100. 0
:(COMMAND BLOCK FOR ACCELERATION)
L1000+t X100. 0+a
L2000-t X200. 0-a
:(COMMAND BLOCK FOR DECELERATION)
L2000 X200. 0
:
```

<TABLE FORMAT DATA IN RELATED ART DISCLOSED IN JAPANESE PATENT LAID-OPEN
NO. 2007-304714>

```
<TIME_TABLE_0401_X>
:
L1000 X100. 0         R02  Qxx
L1000+t X100. 0+a
L2000-t X200. 0-a     R02  Qxx
L2000 X200. 0
:
```

<TABLE FORMAT DATA IN PRESENT INVENTION>

```
<TIME_TABLE_0101_X>
:
L1000 X100. 0
L2000 X200. 0
:
```

FIG.8
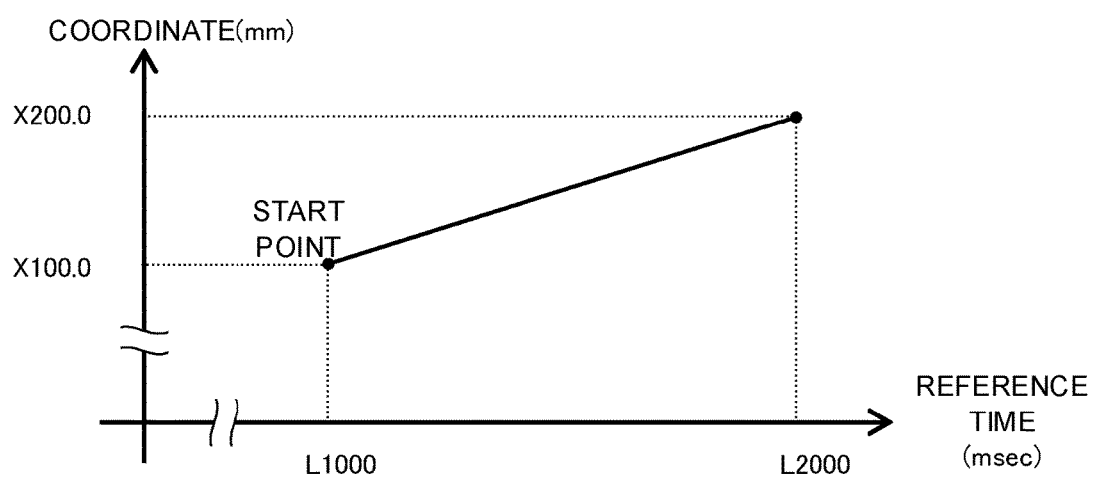
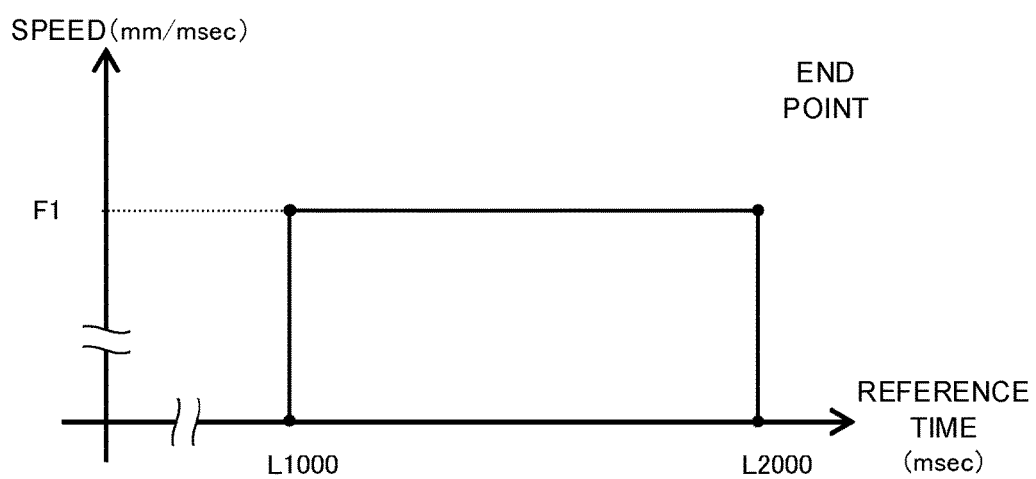

FIG.9
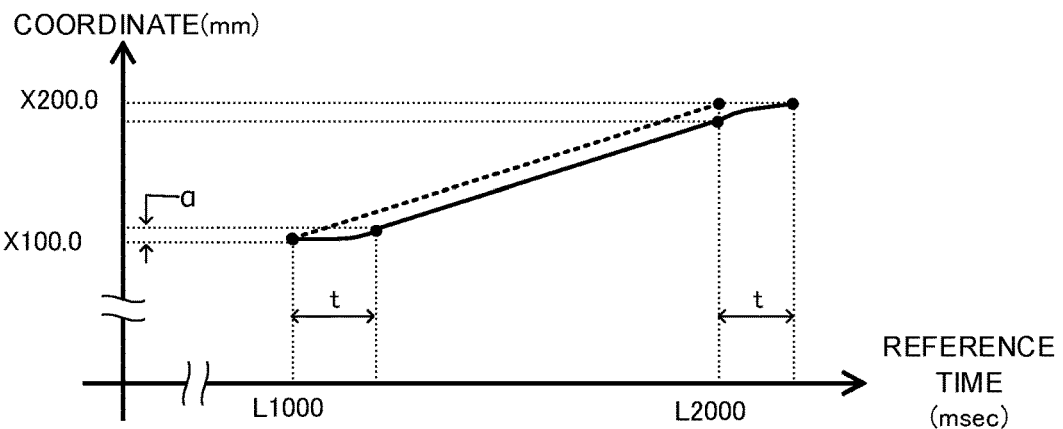
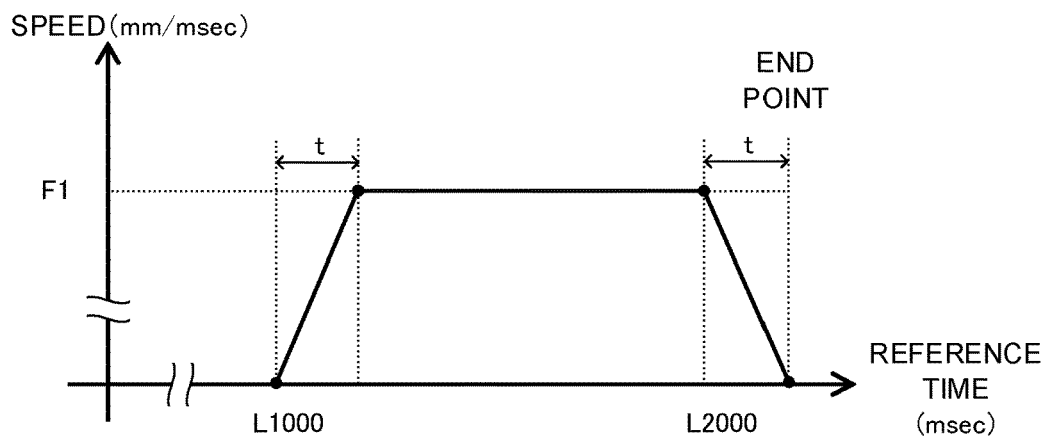
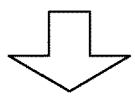
```
<TIME_TABLE_0201_X>
:
L1000   X100.0
:(COMMAND BLOCK FOR ACCELERATION)
L1000+t X100.0+a
L2000   X200.0-a
:(COMMAND BLOCK FOR DECELERATION)
L2000+t X200.0
:
```

FIG.10
```
<TIME_TABLE_0301_X>
:
L1000 X100.0
:(COMMAND BLOCK FOR ACCELERATION)
L1000+t X100.0+a
L2000-t X200.0-a
:(COMMAND BLOCK FOR DECELERATION)
L2000 X200.0
:
```
} PROGRAM FOR ACCELERATION SEGMENT
} PROGRAM FOR DECELERATION SEGMENT
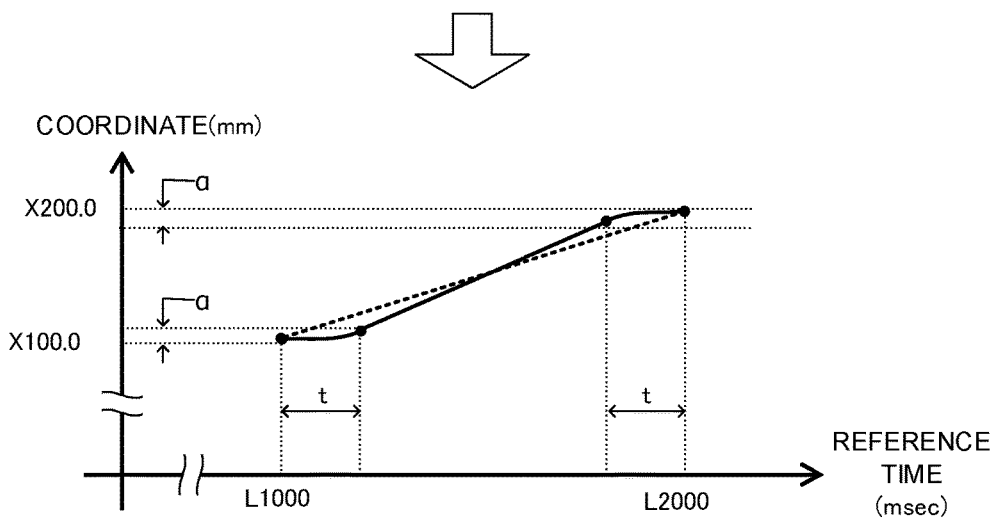
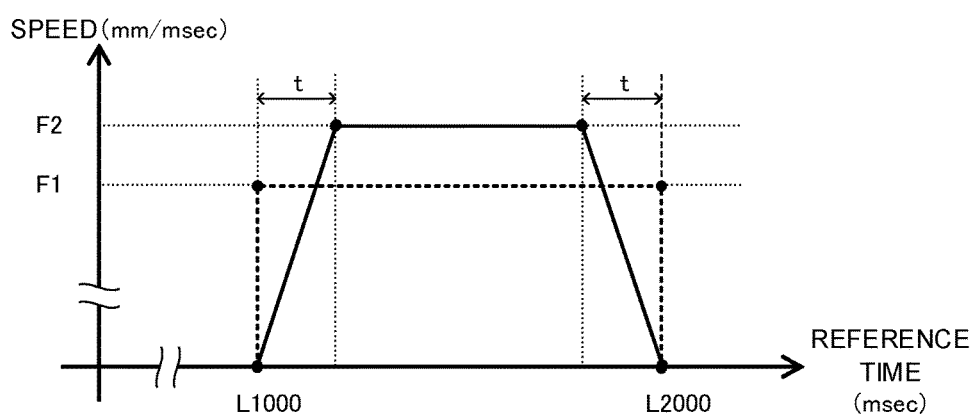

FIG.11

<TABLE FORMAT DATA IN RELATED ART DISCLOSED IN JAPANESE PATENT LAID-OPEN NO. 2007-304714>

```
<TIME_TABLE_0401_X>
..
L1000    X100.0       R02  Qxx  ⎫ QUADRATIC FUNCTION CONNECTION
L1000+t  X100.0+α                ⎭ (CONSTANT ACCELERATION)
L2000-t  X200.0-α     R02  Qxx  ⎫ QUADRATIC FUNCTION CONNECTION
L2000    X200.0                  ⎭ (CONSTANT ACCELERATION)
..
```

NUMERICAL CONTROLLER PERFORMING TABLE-FORMAT-DATA-BASED OPERATION

RELATED APPLICATIONS

The present application claims priority to Japanese Application Number 2015-131716, filed Jun. 30, 2015, the disclosure of which is hereby incorporated by reference herein in its entirety.

BACKGROUND OF THE INVENTION

1. Field of the Invention

The present invention relates to a numerical controller, and particularly to a numerical controller that automatically performs acceleration/deceleration control in table-format-data-based operation.

2. Description of the Related Art

As a method for driving and controlling controlled axes in synchronization with one another in synchronization with motion of a reference axis, there is a known table-format-data-based operation function of storing information on the positions of the controlled axes in table format data provided in a memory or any other component in correspondence with the position of the reference axis and operating the controlled axes in synchronization with the reference axis on the basis of the information stored in the table format data.

Japanese Patent Laid-Open No. 2003-303005 discloses a numerical controller that performs numerical control called a path table operation function or electronic cam control using the table-format-data-based operation function. The numerical controller allows arbitrary tool action free from a machining program, whereby the machining period can be shortened and high-precision machining can be achieved.

In the table-format-data-based operation disclosed in Japanese Patent Laid-Open No. 2003-303005, when table-format-data-based operation shown in FIG. 8 is performed, a controlled axis linearly moves between command blocks (moves at constant speed) and is therefore abruptly accelerated and decelerated, resulting in large impact acting on a machine being controlled.

To reduce the impact associated with the abrupt acceleration and deceleration, an operator needs to add command blocks for acceleration and deceleration to the table format data.

Japanese Patent Laid-Open No. 2007-304714 discloses a technology for performing acceleration/deceleration control by using quadratic/cubic function connection in table-format-data-based operation. When the technology is used, a controlled axis moves between two points with constant acceleration applied in the quadratic function connection, or moves with constant jerk applied in the cubic function connection.

FIG. 8 shows an example of typical table format data. In the table format data illustrated in FIG. 8, a set of a reference value expressed in the form of a command L and an X coordinate or a Y coordinate expressed in the form of a command X, Y, or any other coordinate is written in one line, and a plurality of lines are specified. The thus configured table format data commands the numerical controller to move an axis to a specified coordinate value at a specified reference value.

When acceleration and deceleration are applied in the typical table-format-data-based operation shown in FIG. 8, gentle acceleration and deceleration are performed at the start point and the end point of driven axis action that are specified by the table format data, but the controlled axis does not reach the specified coordinate value at the specified reference value (reference time), undesirably resulting in a discrepancy between the action specified by the table format data and the actual action of the controlled axis.

FIG. 9 shows motion of a controlled axis in the form of graphs in a case where an acceleration/deceleration technology is applied to the operation based on the table format data <TIME_TABLE_0101_X> shown in FIG. 8. As shown in FIG. 9, when acceleration/deceleration control is performed at the start point and the end point by using an acceleration/deceleration period t, the controlled axis does not reach X200.0, which is the end point, at a reference value L2000.0. If the action of the controlled axis shown in the upper graph of FIG. 9 is inverse-transformed to table format data, it is found that the content of the inverse-transformed table format data differs from the content of the original table format data <TIME_TABLE_0101_X>, as indicated by the table format data <TIME_TABLE_0201_X> shown in the lower section of FIG. 9.

As described above, when acceleration/deceleration is applied to typical table-format-data-based operation, the relative relationship between a specified reference value and the coordinates of the controlled axis deteriorates, and the controlled axis undesirably cannot be synchronized with the other axes. Therefore, to add command blocks for acceleration/deceleration to the table format data, the operator needs to calculate necessary acceleration/deceleration and write acceleration and deceleration command blocks that explicitly reflect a result of the calculation in the table format data. FIG. 10 shows an example of table format data to which the operator adds acceleration and deceleration command blocks in consideration of the relative relationship between a reference value and the coordinates of the controlled axis. As shown in FIG. 10, the operator needs to calculate in advance a time constant t and a travel $\alpha$ associated with the acceleration/deceleration and create by himself/herself table format data <TIME_TABLE_0301_X> in which a result of the calculation is incorporated.

It is therefore difficult for the operator to create table format data, and the operator further needs to write acceleration and deceleration command blocks, undesirably resulting in an increase in the size of the table format data and an increase in the program volume.

The same holds true for a case where the technology disclosed in Japanese Patent Laid-Open No. 2007-304714 is used. FIG. 11 shows an example in which the technology disclosed in Japanese Patent Laid-Open No. 2007-304714 is used to add commands to perform acceleration/deceleration to table format data. When the quadratic/cubic function connection disclosed in Japanese Patent Laid-Open No. 2007-304714 is introduced, integrating the acceleration segment program and the deceleration segment program with each other into a single block reduces the size of the table format data to a small value, but the operator still undesirably needs to create table format data including pre-calculated time constant t and travel $\alpha$ associated with the acceleration/deceleration.

SUMMARY OF THE INVENTION

An object of the present invention is to provide a numerical controller that performs, in table-format-data-based operation control, acceleration/deceleration control with a reference value and the coordinates of a controlled axis synchronized with each other without pre-calculation of acceleration/deceleration or addition of a command block.

A numerical controller according to the present invention is a numerical controller that uses table format data that specifies a position of each controlled axis with respect to a reference value based on time, an axis position, or a spindle position to control the position of the controlled axis in synchronization with the reference value, the numerical controller including a reading unit that sequentially reads command blocks from the table format data, analyzes the command blocks to acquire a reference value and a coordinate value of a control point, and outputs the reference value and the coordinate value, a segment distinction unit that divides movement to the control point into an acceleration segment, a constant speed segment, and a deceleration segment based on the reference value and the coordinate value of the control point acquired from the reading unit and an acceleration time constant and a deceleration time constant set in advance, a feed speed calculation unit that calculates a feed speed in the constant speed segment based on the reference value of the control point acquired from the reading unit and the acceleration time constant and the deceleration time constant, and a distribution process unit that calculates a travel of an axis controlled by the table format data for each control cycle based on the reference value and the coordinate value of the control point acquired from the reading unit. The feed speed calculated by the feed speed calculation unit is a feed speed that is calculated based on acceleration/deceleration control in the acceleration segment and the deceleration segment and corrects delay in the coordinate value with respect to the reference value. The segment distinction unit determines whether a segment currently under control is the acceleration segment, the constant speed segment, or the deceleration segment based on a current value of the reference value acquired for each control cycle. The distribution process unit calculates the travel for each control cycle based on a result of the determination made by the segment distinction unit by using acceleration based on the acceleration time constant in the acceleration segment, using the feed speed calculated by the feed speed calculation unit in the constant speed segment, and using deceleration based on the deceleration time constant in the deceleration segment.

In the numerical controller according to the present invention, the operator does not need to perform pre-calculation of acceleration and deceleration, whereby the table format data can be readily created. Further, since the operator does not need to explicitly write command blocks for the acceleration/deceleration in the table format data, whereby the size of the table format data is greatly reduced.

The numerical controller according to the present invention may further include a time constant conversion unit that converts a time constant specified based on the time, the axis position, or the spindle position into another reference value, and the time constant conversion unit may convert, when a type of a reference value in the table format data differs from a type of a time constant specified in advance, the time constant into a reference period based on a travel of a reference axis or the spindle per unit time when the reference value is the axis position or the spindle position, or convert the time constant into an axis position or a spindle position based on a travel of an axis under the conversion or the spindle per unit time when the reference value is a time, and the time constant conversion unit notifies the segment distinction unit and the feed speed calculation unit of a result of the conversion.

The numerical controller according to the present invention may further include a time constant analysis unit that analyzes a time constant specified in the table format data and notifies the segment distinction unit and the feed speed calculation unit of a result of the analysis.

The numerical controller according to the present invention may further include a speed evaluation unit that evaluates whether the feed speed calculated by the feed speed calculation unit exceeds a preset speed range, and the speed evaluation unit may notify the distribution process unit of an error when the feed speed calculated by the feed speed calculation unit exceeds the preset speed range.

BRIEF DESCRIPTION OF THE DRAWINGS

The object and features of the present invention described above and other objects and features thereof will be apparent from the description of the following embodiments with reference to the accompanying drawings:

FIG. 2 describes a method for calculating a feed speed F2 in acceleration/deceleration control in the present invention;

FIG. 4 compares table format data in related art with table format data in the present invention created in consideration of acceleration/deceleration control;

FIG. 8 describes controlled axis operation control based on typical table format data;

FIG. 9 describes table format data in a case where acceleration/deceleration control of related art is performed;

FIG. 10 describes table format data in a case where acceleration/deceleration control is performed in consideration of synchronization between a reference value and the position of a controlled axis; and FIG. 11 describes table format data in related art disclosed in Japanese Patent Laid-Open No. 2007-304714.

DETAILED DESCRIPTION OF THE PREFERRED EMBODIMENTS

Embodiments of the present invention will be described below with reference to the drawings.

The present invention provides a numerical controller having a technical configuration in which acceleration/deceleration is automatically applied to a command to move between two points in table-format-data-based operation. To complete the action in the reference value difference (specified movement period) between command blocks in the table format data, the numerical controller according to the present invention corrects delay produced by the acceleration/deceleration in a constant speed segment between an acceleration segment and a deceleration segment.

Figure 1:
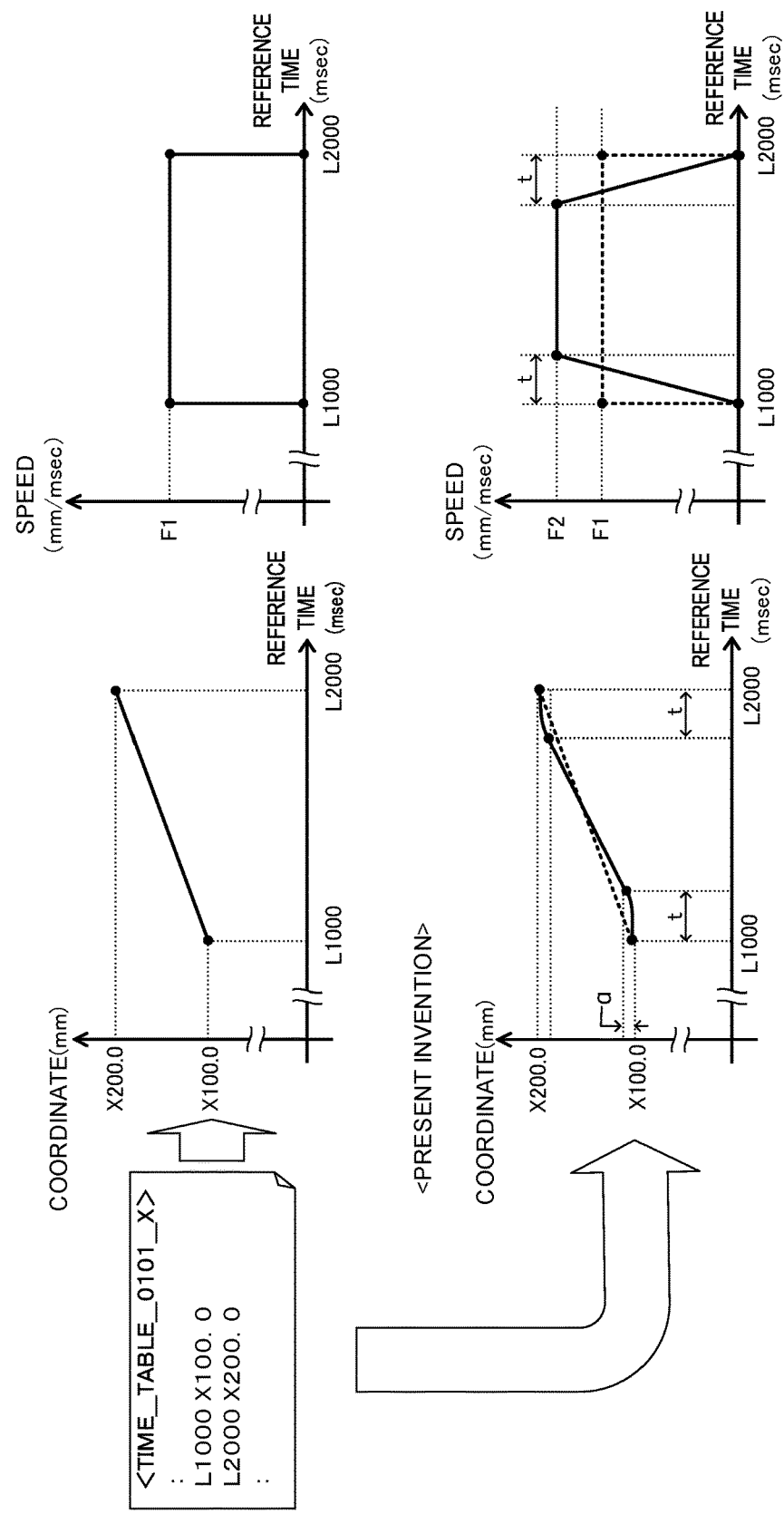
FIG. 1 compares typical table-format-data-based controlled axis operation control with table-format-data-based controlled axis operation control according to the present invention.

FIG. 1 compares table-format-data-based controlled axis operation control in a numerical controller of related art with table-format-data-based controlled axis operation control in a numerical controller according to the present invention. As shown in FIG. 1, when the numerical controller of related art performs controlled axis operation control based on table format data <TIME_TABLE_0101_X>, the relative relationship between each reference value and the coordinates of the controlled axis is maintained, but abrupt acceleration/deceleration is performed at the start point and the end point of the action of the controlled axis.

In contrast, when the numerical controller according to the present invention performs controlled axis operation control based on the same table format data <TIME_TABLE_0101_X>, gentle acceleration/deceleration is performed at the start point and the end point of the action of the controlled axis, and delay produced by the acceleration/deceleration is corrected by changing the feed speed in the constant speed segment from F1 to F2. Since the control described above is automatically performed, an operator does not need to correct the table format data, and no extra acceleration/deceleration command blocks are written in the table format data.

FIG. 2 describes a method for calculating the feed speed F2 in the acceleration/deceleration control according to the present invention. The numerical controller according to the present invention determines the feed speed F2 in such a way that the travel between command blocks in the table format data in a case where no acceleration/deceleration control is performed is equal to the travel in a case where acceleration/deceleration control is performed.

Let F1 be the feed speed in the case where no acceleration/deceleration is applied, F2 be the feed speed in the case where acceleration/deceleration is applied, T be the reference value difference between command blocks, and $t_1$ be the acceleration time constant and $t_2$ be the deceleration time constant used in the acceleration/deceleration control, and the travel in the case where no acceleration/deceleration control is performed is the area of the obliquely hatched portion of the graph in the middle section of FIG. 2, whereas the travel in the case where acceleration/deceleration control is performed by using constant acceleration is the area of the meshed portion of the graph in the middle section of FIG. 2. The feed speed F2 can therefore be expressed by the following Expression 1:

$$F1 \times T = \left(\frac{1}{2} \times t_1 \times F2\right) + F2 \times (T - t_1 - t_2) + \left(\frac{1}{2} \times t_2 \times F2\right)$$ [Expression 1]

⇩

$$F2 = F1 \times \frac{T}{T - \frac{1}{2}t_1 - \frac{1}{2}t_2}$$

1 Travel in the case where no acceleration/deceleration is applied=travel in the case where acceleration/deceleration is applied On the other hand, in a case where acceleration/deceleration is applied by using jerk control indicated by the graph in the lower section of FIG. 2, let $J_1$ and $J_2$ be the jerk, $t_1$ be the acceleration time constant, and $t_2$ be the deceleration time constant, and the travel in the acceleration/deceleration segment can be determined by the following Expression 2 using the jerk $J_1$ and $J_2$. It is noted in Expression 2 that the travel in the deceleration segment is calculated by a simplified expression with respect to the deceleration start time.

$$\int_0^{t_1} \frac{1}{2} J_1 t^2 dt$$ [Expression 2]

$$\int_{T-t_2=0}^{t_2} \left(F2 + \frac{1}{2} J_2 t^2\right) dt$$

1 Travel in acceleration segment
2 Travel in deceleration segment

On the basis of Expression 2 described above, the relationship between the travel before the acceleration/deceleration is applied and the travel after the acceleration/deceleration is applied can be expressed by the following Expression 3:

$$F1 \times T = \int_0^{t_1} \frac{1}{2} J_1 t^2 dt +$$ [Expression 3]
$$F2 \times (T - t_1 - t_2) + \int_{T-t_2=0}^{t_2} \left(F2 + \frac{1}{2} J_2 t^2\right) dt$$

The jerk $J_1$ and $J_2$ can be expressed by the following Expression 4:

$$J_1 = (2 \times F2)/t_1^2$$
$$J_2 = (2 \times F2)/t_2^2$$ [Expression 4]

Substituting Expression 4 into Expression 3 provides the following Expression 5:

$$F1 \times T =$$ [Expression 5]
$$\int_0^{t_1} \frac{F2}{t_1^2} t^2 dt + F2 \times (T - t_1 - t_2) + \int_{T-t_2=0}^{t_2} \left(F2 + \frac{F2}{t_2^2} t^2\right) dt$$

Solving Expression 5 for the feed speed F2 allows the feed speed F2 to be expressed by the following Expression 6:

$$F2 = F1 \times \frac{T}{T - \frac{2}{3}t_1 - \frac{1}{3}t_2}$$ [Expression 6]

In the process of the calculation described above, it is assumed that the relative relationship with preceding action has been so calculated that the acceleration and the speed at the acceleration/deceleration start time are zero.

The calculation method in the case where the acceleration and the jerk are constant has been disclosed, and the travels in the acceleration/deceleration segments under other types of acceleration/deceleration control can also be calculated by using the same procedure.

After the feed speed F2 is calculated as described above, movement between command blocks is divided in an internal process into the acceleration segment, the constant speed segment, and the deceleration segment, and a distribution process is so carried out that the acceleration/deceleration is performed by using the time constant t in the acceleration/deceleration segments and the speed in the constant speed segment is equal to the feed speed F2. The acceleration/deceleration control in the present invention is thus achieved.

Figure 3:
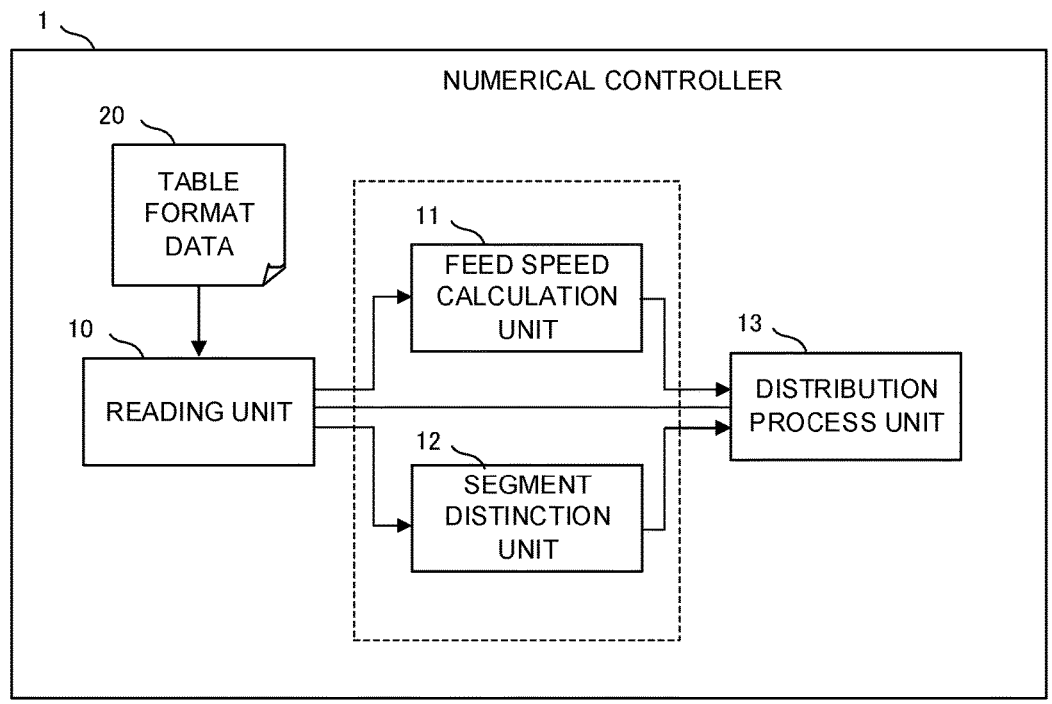
FIG. 3 is a functional block diagram of a numerical controller in a first embodiment of the present invention.

FIG. 3 is a functional block diagram of the numerical controller in the first embodiment of the present invention. A numerical controller 1 according to the present invention includes a reading unit 10, a feed speed calculation unit 11, a segment distinction unit 12, and a distribution process unit 13. The function means enclosed by the dotted-line frame in FIG. 3 represent novel function means introduced in the present invention.

The reading unit 10 reads table format data 20 from a memory or any other component that is not shown and outputs a reference value and a coordinate value of each control point that are acquired from the read table format data 20 to the feed speed calculation unit 11 and the segment distinction unit 12.

The feed speed calculation unit 11 calculates a difference T in the reference value between command blocks on the basis of the reference value and the coordinate value of each control points that have been received from the reading unit 10, reads an acceleration/deceleration time constant t set in advance or specified, for example, by a program from a memory that is not shown, and uses the values described above to calculate the feed speed F2 in the constant speed segment on the basis of Expression 1.

The segment distinction unit 12 divides the movement between the command blocks into the acceleration segment, the constant speed segment, and the deceleration segment on the basis of the reference values of the control points received from the reading unit 10, the acceleration/deceleration time constant t, and other values. The segment distinction unit 12 then acquires the current reference value in the action for each control cycle, determines whether the current controlled segment is the acceleration/deceleration segments or the constant speed segment in accordance with the current reference value, and commands the distribution process unit to carry out a distribution process according to the determined segment on the basis of a result of the determination.

The distribution process unit 13 then calculates the travel of the controlled axis for each control cycle on the basis of the reference value the coordinates value of each control point received from the reading unit 10, the acceleration/deceleration time constant t, the feed speed F2 in the constant speed segment calculated by the feed speed calculation unit 11, and the command from the segment distinction unit 12 by using acceleration or jerk when the current controlled segment is the acceleration or deceleration segment or by using the feed speed F2 when the current controlled segment is the constant speed segment, and the distribution process unit 13 carries out the distribution process of distributing the calculated travel to the controlled axis.

Details of the distribution process are fully found in related art, such as Japanese Patent Laid-Open No. 2003-303005 and Japanese Patent Laid-Open No. 2007-304714 and will not therefore be described in the present specification.

A description will next be made of advantageous effects provided when the numerical controller in the embodiment of the present invention having the configuration described above performs acceleration/deceleration control in table-format-data-based operation control. FIG. 4 compares table format data in related art with table format data in the present invention created in consideration of acceleration/deceleration control.

As shown in FIG. 4, when acceleration/deceleration control is performed in typical table-format-data-based operation control, the operator needs to calculate the time constant t used in the acceleration/deceleration and the travel α of a controlled axis that moves at the time of the acceleration/deceleration and then add, to the table format data, a command block for dividing the movement of the controlled axis into the acceleration segment, the constant speed segment, and the deceleration segment and command blocks for acceleration and deceleration.

Also in a case where the acceleration/deceleration control is performed in table-format-data-based operation control to which the technology disclosed in Japanese Patent Laid-Open No. 2007-304714 is introduced, a command block for dividing the movement of a controlled axis into the acceleration segment, the constant speed segment and the deceleration segment is required, and the operator therefore needs to calculate the time constant t used in the acceleration/deceleration and the travel α of the controlled axis that moves at the time of the acceleration/deceleration and then add the division command block and commands associated with acceleration and deceleration to the table format data.

In contrast, in a case where the technology disclosed in the present invention is used to perform acceleration/deceleration control in table-format-data-based operation control, table format data created by the operator (in no consideration of acceleration or deceleration) is directly read, and an acceleration/deceleration process in consideration of each reference value is carried out in an internal process. Therefore, since the operator does not need to calculate acceleration/deceleration or add special command blocks for the acceleration/deceleration control, whereby table format data is readily created. Further, as another advantageous effect, the size of the table format data is greatly reduced, whereby the outlook on the entire table format data is improved.

The embodiment of the present invention has been described above, but the present invention is not limited only to the embodiment described above, and the present invention can be implemented in a variety of aspects by appropriately changing the embodiment described above.

For example, also in axis-position-based or spindle-position-based table format data, as in time-based table format data having been described by way of example, the feed speed F2 can be similarly calculated from the difference between reference values, the time constant, and the feed speed F1.

Figure 5:
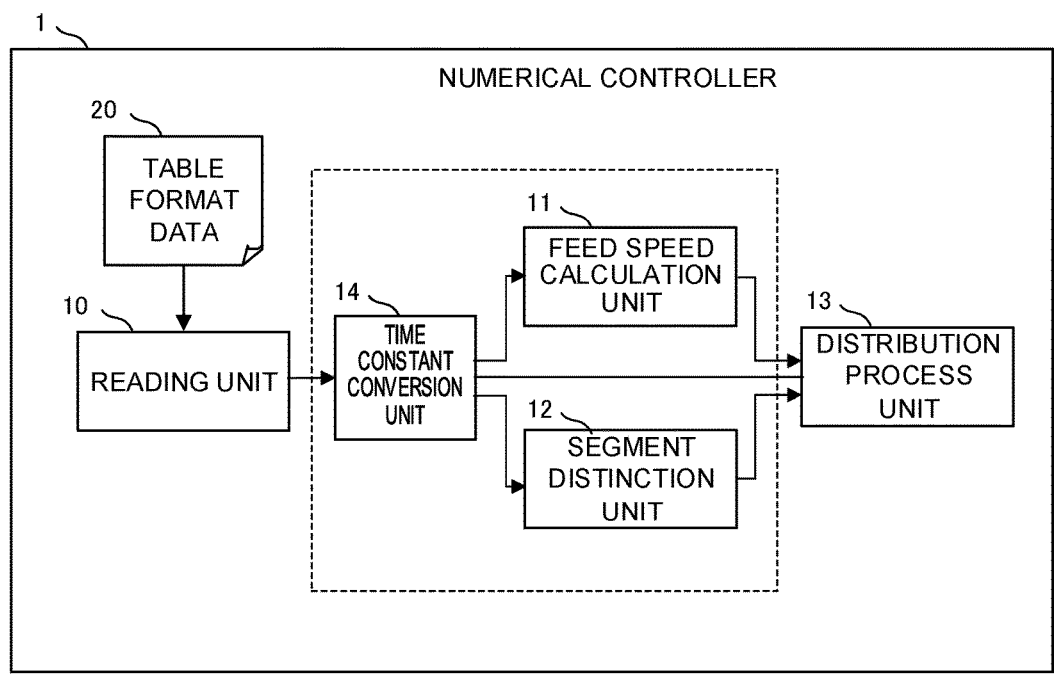
FIG. 5 is a functional block diagram of a numerical controller in a second embodiment of the present invention.

FIG. 5 is a functional block diagram of a numerical controller in a second embodiment of the present invention. A numerical controller 1 in the present embodiment differs from the numerical controller 1 in the first embodiment in that a time constant conversion unit 14 is added.

The time constant conversion unit 14 converts, when the type of reference values in the table format data 20 in operation differs from the type of a time constant specified in advance, the time constant into a reference period on the basis of the travel of a reference axis or the spindle per unit time when the reference values are positions of the axis or the spindle, or converts the time constant into a position of the axis or the spindle when the reference values are periods, and the time constant conversion unit 14 notifies the segment distinction unit 12 and the feed speed calculation unit 11 of a result of the conversion.

In table-format-data-based operation, the same axis is moved on the basis of time-based, axis-position-based, and spindle-position-based table format data in accordance with the type of machining. Providing the time constant conversion unit 14 eliminates the need to specify time constants according to all the types of reference value, whereby the same acceleration/deceleration control can be achieved by specifying a single time constant irrespective of the reference value based on which the table format data is in operation.

Further, specifying a time constant in the header of the table format data or the command blocks for acceleration/ deceleration allows an appropriate time constant to be set for each set of table format data in operation.

Figure 6:
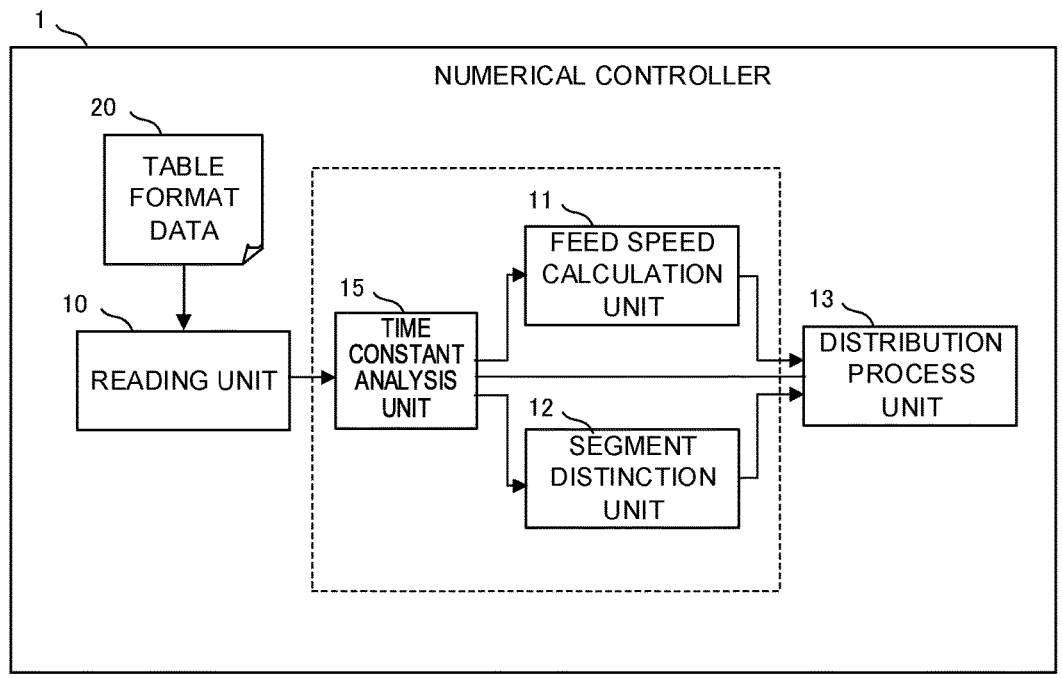
FIG. 6 is a functional block diagram of a numerical controller in a third embodiment of the present invention.

FIG. 6 is a functional block diagram of a numerical controller in a third embodiment of the present invention. A numerical controller 1 in the present embodiment differs from the numerical controller 1 in the first embodiment in that a time constant analysis unit 15 is added.

The time constant analysis unit 15 has a function of analyzing a time constant specified by the description of the table format data 20 and notifying the segment distinction unit 12 and the feed speed calculation unit 11 of a result of the analysis.

In this configuration, specifying a time constant in the header of the table format data or the command blocks for acceleration/deceleration allows an appropriate time constant to be set for each table format data in operation.

Further, the feed speed calculated by the feed speed calculation unit 11 can be so limited not to exceed a preset limit speed of the machine.

Figure 7:
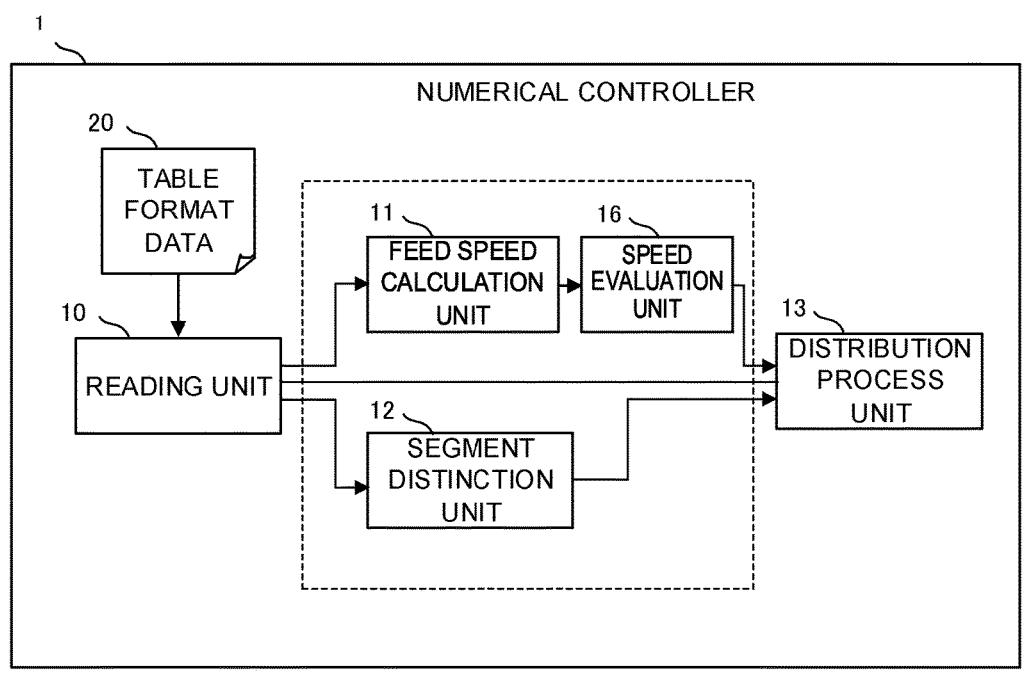
FIG. 7 is a functional block diagram of a numerical controller in a fourth embodiment of the present invention.

FIG. 7 is a functional block diagram of a numerical controller in a fourth embodiment of the present invention. A numerical controller 1 in the present embodiment differs from the numerical controller 1 in the first embodiment in that a speed evaluation unit 16 is added.

The speed evaluation unit 16 has a function of evaluating whether the feed speed calculated by the feed speed calculation unit 11 exceeds a preset speed range and notifying the distribution process unit 13 of an error when the feed speed exceeds the preset speed range.

In this configuration, the safety of the machine can be ensured by evaluation of whether the feed speed calculated by the feed speed calculation unit 11 exceeds a preset limit speed of the machine.

The embodiments of the present invention have been described above, but the present invention is not limited to the embodiments described above, and the invention can be implemented in other aspects with appropriate changes made to the embodiments described above.

The invention claimed is:

1. A numerical controller configured to use table format data for specifying a position of each controlled axis with respect to a reference value based on time, an axis position, or a spindle position to control the position of the controlled axis in synchronization with the reference value, the numerical controller comprising:
    a reading unit configured to read command blocks from the table format data, analyze the command blocks to acquire a reference value and a coordinate value of a control point, and output the reference value and the coordinate value;
    a segment distinction unit configured to divide a movement path of the controlled axis from a current point to the control point into
        (1) an acceleration segment at a start of the movement path,
        (2) a constant speed segment subsequent to the acceleration segment, and
        (3) a deceleration segment subsequent to the constant speed segment at an end of the movement path, based on
        (a) the reference value and the coordinate value of the control point acquired from the reading unit, and
        (b) an acceleration time constant set in advance for the acceleration segment and a deceleration time constant set in advance for the deceleration segment;
    a feed speed calculation unit configured to calculate a feed speed in the constant speed segment, which occurs between the acceleration segment and the deceleration segment, based on the reference value of the control point acquired from the reading unit and the acceleration time constant and the deceleration time constant; and
    a distribution process unit configured to calculate a travel of an axis controlled by the table format data for each control cycle based on the reference value and the coordinate value of the control point acquired from the reading unit,
    wherein
    the feed speed calculated by the feed speed calculation unit is a feed speed for correcting, within the constant speed segment, a delay in the coordinate value with respect to the reference value, wherein
        the delay is a sum of a first delay produced as a result of acceleration control in (1) the acceleration segment and a second delay produced as a result of deceleration control in (3) the deceleration segment, and
        the feed speed is determined such that a first travel between command blocks in the table format data in a first case where no acceleration control and no deceleration control are performed is equal to a second travel between the command blocks in the table format data in a second case where at least one of the acceleration control or the deceleration control is performed,
    the segment distinction unit is configured to determine whether a segment currently under control is the acceleration segment, the constant speed segment, or the deceleration segment based on a current value of the reference value acquired for each control cycle, and
    the distribution process unit is configured to calculate the travel for each control cycle based on a result of the determination made by the segment distinction unit by using acceleration based on the acceleration time constant in the acceleration segment,
        using the feed speed calculated by the feed speed calculation unit in the constant speed segment, and
        using deceleration based on the deceleration time constant in the deceleration segment, and
    the numerical controller is configured to control the position of the controlled axis based on the travel calculated by the distribution process unit.

2. The numerical controller according to claim 1, further comprising:
    a time constant conversion unit configured to convert a time constant specified based on the time, the axis position, or the spindle position into another reference value, wherein
    the time constant conversion unit is configured to perform a conversion to
        convert, when a type of a reference value in the table format data differs from a type of a time constant specified in advance, the time constant into a reference period based on a travel of a reference axis or the spindle per unit time when the reference value is the axis position or the spindle position, or
        convert the time constant into an axis position or a spindle position based on a travel of an axis under the conversion or the spindle per unit time when the reference value is a time, and
    the time constant conversion unit is further configured to notify the segment distinction unit and the feed speed calculation unit of a result of the conversion.

3. The numerical controller according to claim 1, further comprising:
   a time constant analysis unit configured to
      analyze a time constant specified in the table format data, and
      notify the segment distinction unit and the feed speed calculation unit of a result of the analysis.

4. The numerical controller according to claim 1, further comprising:
   a speed evaluation unit configured to
      evaluate whether the feed speed calculated by the feed speed calculation unit exceeds a preset speed range, and
      notify the distribution process unit of an error when the feed speed calculated by the feed speed calculation unit exceeds the preset speed range.

5. The numerical controller according to claim 1, wherein the feed speed calculation unit is configured to calculate the feed speed so that a travel between command blocks in the table format data in a case where no acceleration/deceleration control is performed is equal to a travel in a case where acceleration/deceleration control is performed.

6. The numerical controller according to claim 1, wherein the feed speed calculation unit is configured to read the acceleration time constant and the deceleration time constant set in advance by a program from a memory.

* * * * *